Aug. 1, 1961 T. C. HARMAN 2,994,818
METHOD AND APPARATUS FOR MEASURING THERMOELECTRIC PROPERTIES
Filed Sept. 21, 1959
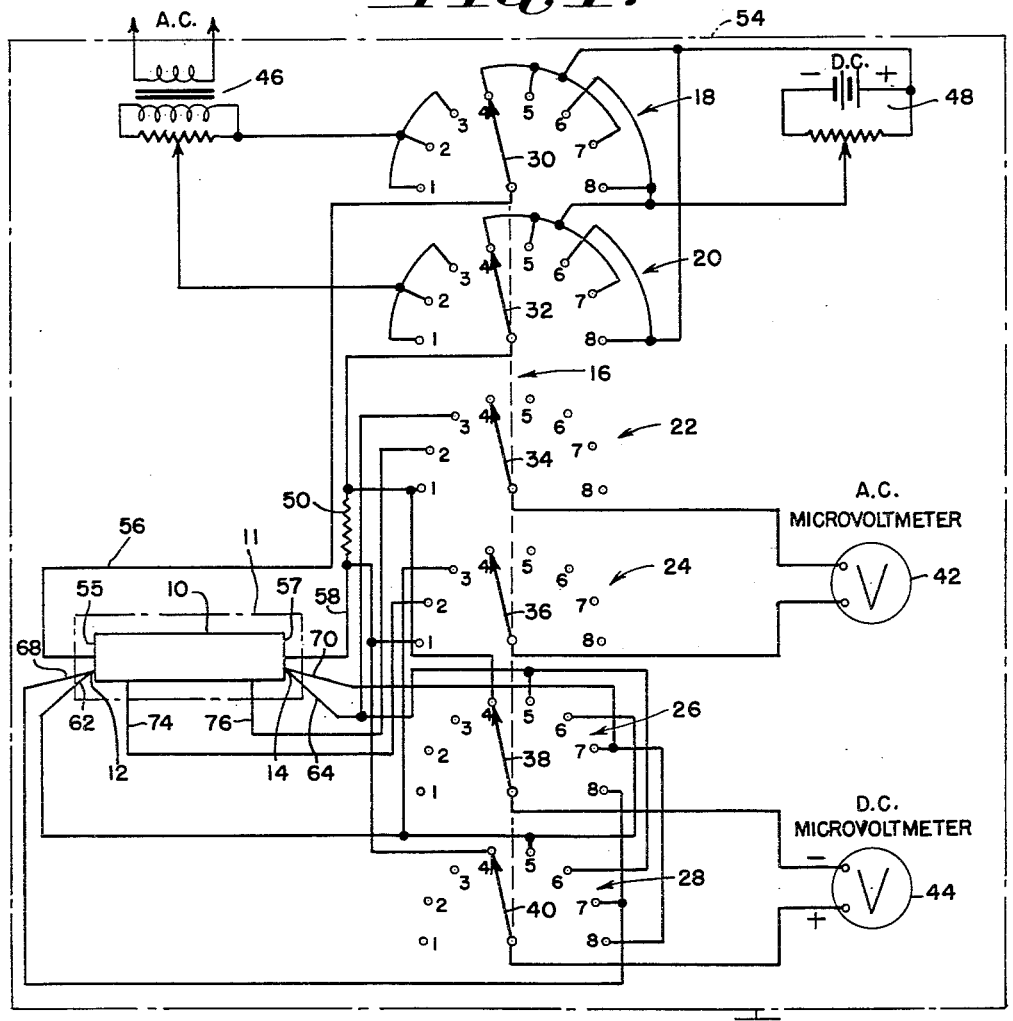
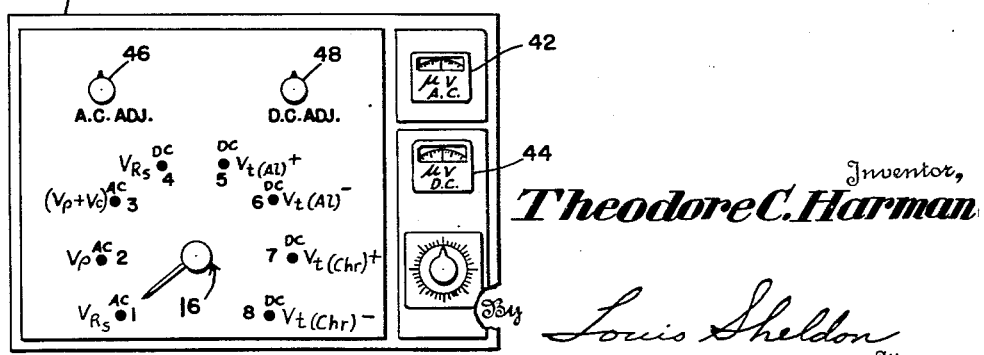
Inventor,
*Theodore C. Harman*
By *Louis Sheldon*
Attorney

United States Patent Office 2,994,818
Patented Aug. 1, 1961

2,994,818
METHOD AND APPARATUS FOR MEASURING THERMOELECTRIC PROPERTIES
Theodore C. Harman, Lexington, Mass., assignor, by mesne assignments, to the United States of America as represented by the Secretary of the Navy
Filed Sept. 21, 1959, Ser. No. 841,422
10 Claims. (Cl. 324—32)

This invention relates to thermoelectricity and is concerned more particularly with a method and apparatus for testing samples of thermoelectric semiconductors having an appreciable figure of merit for determining absolute values of thermal conductivity and other thermoelectric properties or parameters.

Prior methods required relatively large samples. Such samples are relatively undependable for homogeneity; moreover, two samples were required in each test, one being employed for the determination of resistivity and the other for the determination of the thermoelectric power and the thermal conductivity. Both samples were assumed to have the same composition, and this assumption led to error in most cases because of the usual non-uniformity of composition of any two samples. Further, with prior methods there was no assurance that all radiation losses were accounted for; the apparatus was large and cumbersome; and about ten hours more or less were required to complete a test on one sample.

It is an object of the invention to provide a simplified accurate method and apparatus for obtaining the measurements from which the desired parameters of a thermoelectric semiconductor having an appreciable figure of merit may be determined.

Another object is to provide an effective method for obtaining all of the desired measurements using a single sample.

A further object is to provide an effective method for obtaining such measurements, using a relatively small substantially homogeneous sample.

Another object is to provide an effective method for obtaining all needed measurements and completing a test in a matter of minutes.

An additional object is to provide a single apparatus for obtaining all needed measurements.

It is also an object to enable one to determine quickly whether a sample has an appreciable figure of merit.

Further objects and advantages of the invention will appear as the description proceeds.

The invention will be better understood on reference to the following description and accompanying more or less schematic drawing, wherein:
FIG. 1 is essentially a circuit diagram; and
FIG. 2 shows a control and indicating panel therefor.

The figure of merit $z$ of a sample of thermoelectric semiconductor is given by the equation $$z = \frac{\alpha^2}{\rho k}$$

where $\alpha$ is the thermoelectric power or Seebeck coefficient, $\rho$ is the resistivity, and $k$ is the thermal conductivity.

The resistivity can be found from the equation $$\rho = \frac{r_b A}{b}$$

where $r_b$ is the resistance of a predetermined intermediate portion $b$ of the sample, and A is the predetermined uniform cross-sectional area of the sample.

The resistance $r_b$ is found by the equation $$r_b = \frac{V_b}{I}$$

where $V_b$ is the voltage drop across the portion $b$ of the sample, and I is the current flowing through the sample.

In accordance with the invention, the test is conducted in a shielded room or cage, and initially the sample is connected in series with an adjustable 60-cycle A.C. source and a known resistance R, and the voltage drop $V_R$ across the resistance is measured with a high impedance A.C. vacuum tube microvoltmeter. Then I is computed from the equation $$I = \frac{V_R}{R}$$

The voltage $V_b$ is now measured, whereupon the resistance $r_b$ and then the resistivity $\rho$ is computed.

Of course, the resistivity could have been computed from the equation $$\rho = r_b \frac{A}{b} = \frac{V_b}{I} \frac{A}{b} = \frac{R}{V_R} V_b \frac{A}{b}$$

but the value of I is needed for another purpose, as will appear.

Also, for a purpose which will appear, the value of the IR drop $(V_p + V_c)$ across the like legs of the thermocouples at the ends of the sample is measured by the A.C. microvoltmeter.

The A.C. source is now replaced by an adjustable D.C. source, the voltage across the known resistance R is measured by a D.C. microvoltmeter, and the D.C. is adjusted until the current equals that of the A.C. source previously used.

The direct current develops a temperature gradient along the sample by the thermoelectric process. If the system is adiabatic except for the introduction of the Joule and Thomson heats which result from the current flow, then at steady state (which is achieved in about one second for samples of small dimensions and correspondingly longer periods for larger samples) the heat from the Peltier effect is transported in one direction along the sample at the rate at which it is transported in the opposite direction by thermal conduction, that is, $$\frac{dQ}{dt} = \alpha I T = k \Delta T \frac{A}{L} \qquad (1)$$

where I is the current, $\alpha$ is the thermoelectric power or Seebeck coefficient, T is the average absolute temperature of the sample (which can be taken as the absolute room temperature without significant error), $k$ is the thermal conductivity, $\Delta T$ is the difference between the temperatures at the ends of the sample, A is the known cross-sectional area of the sample, and L is the known length of the sample.

The rate of Joule heating of both the sample and the lead wires of a good thermoelectric material can be made several orders of magnitude below the rate of transport of the Peltier heat. Moreover, the Joule heating and contact resistance do not reverse with current. The Thomson heating effect in general is small and is distributed uniformly along the sample. Hence the Joule and Thomson heating effects can be eliminated from consideration in practice.

From Equation 1 it can be seen that if the thermoelectric power $\alpha$ is known, the thermal conductivity $k$ can be determined from measurements of the current I, temperature difference $\Delta T$, absolute room temperature T, and the geometry of the sample.

If, for convenience, the thermocouples attached to the ends of the sample are assumed to be Chromel-Alumel and identical, then the absolute thermoelectric power $\alpha$ in the Chromel-sample-Chromel circuit and in the Alumel-sample-Alumel circuit is given by the equations:

$$\alpha = \frac{V_\alpha}{\Delta T} = \pm \frac{V_{(\text{Chr-s-Chr})}}{\Delta T} + \alpha_{(\text{Chr})} \qquad (2)$$

$$\alpha = \frac{V_\alpha}{\Delta T} = \pm \frac{V_{(Al\text{-}s\text{-}Al)}}{\Delta T} + \alpha_{(Al)} \quad (3)$$

where $V_\alpha$ is the absolute Seebeck potential of the sample, $\Delta T$ is the temperature difference between the two thermocouples attached to the ends of the sample, $V_{(Chr\text{-}s\text{-}Chr)}$ is the thermal E.M.F. of the Chromel-sample-Chromel circuit, $\alpha_{(Chr)}$ is the known absolute thermoelectric power of Chromel, $V_{(Al\text{-}s\text{-}Al)}$ is the thermal E.M.F. of the Alumel-sample-Alumel circuit, and $\alpha_{(Al)}$ is the known absolute thermoelectric power of Alumel. The plus sign in Equations 2 and 3 is used for the case where $\alpha$ is greater than $\alpha_{(Chr)}$, and the negative sign applies whenever $\alpha$ is less than $\alpha_{(Al)}$. Conventionally, the thermoelectric power is positive for p-type materials and is negative for n-type materials.

As demonstrated above and as will appear, determination of the electrical resistivity, thermoelectric power, and thermal conductivity is possible in the same experiment. Circuitry and equipment capable of use for this purpose are shown on the drawing.

When direct current is passing through the sample, a potential $V_t$ exists between the two thermocouples used for measuring $\Delta T$. This potential is the algebraic sum of the IR drop $V_\rho$ along the sample between the thermocouple leads, the voltage drop ($V_c$) due to the electrical contact resistance at the ends of the sample, and the Seebeck potential ($V_{\text{leg-sample-leg}}$) between the sample and the selected like legs of the thermocouples.

At steady state using the D.C. source, the total voltages across the two Alumel leads on the ends of the sample and across the two Chromel leads on the ends of the sample as determined by the usual D.C. null method in the two current directions are $$+V_{t(Al)}^+ = V_\rho + V_c + V_{(Al\text{-}s\text{-}Al)} + V_{\text{Irr}(Al)} \quad (4)$$

$$-V_{t(Al)}^- = -V_\rho - V_c - V_{(Al\text{-}s\text{-}Al)} + V_{\text{Irr}(Al)} \quad (5)$$

$$+V_{t(Chr)}^+ = V_\rho + V_c + V_{(Chr\text{-}s\text{-}Chr)} + V_{\text{Irr}(Chr)} \quad (6)$$

$$-V_{t(Chr)}^- = -V_\rho - V_c - V_{(Chr\text{-}s\text{-}Chr)} + V_{\text{Irr}(Chr)} \quad (7)$$

where $V_{t(Al)}^+$ and $V_{t(Al)}^-$ are the total D.C. voltages across the two Alumel leads on the ends of the sample in respectively the positive and negative directions of the current, $V_{t(Chr)}^+$ and $V_{t(Chr)}^-$ are the total D.C. voltages across the Chromel leads on the ends of the sample in respectively the positive and negative directions of the current, $V_\rho$ is the IR drop across the sample due to the electrical resistance of the sample, $V_c$ is the IR drop due to the electrical contact resistance at the ends of the sample, and $V_{\text{Irr}}$ is a voltage (across the sample) which is irreversible with current and hence with temperature gradient. $V_{\text{Irr}}$ is less than 2% of the total voltage and is believed to be due in part to unequal Joule heating in the vicinity of the two dissimilar material junctions. All of these quantities are positive, changes in signs having been made in the equations.

Algebraic manipulations of Equations 2 to 7 yield for $\Delta T$ and $V_\alpha$ the following relationships:

$$\Delta T = \frac{V_{t(Al)}^+ + V_{t(Al)}^- - V_{t(Chr)}^+ - V_{t(Chr)}^-}{2\alpha_{(Chr\text{-}Al)}} \quad (8)$$

$$V_\alpha = \pm \frac{V_{t(Al)}^+ + V_{t(Al)}^-}{2} - (V_\rho + V_c) + \alpha_{(Al)} \Delta T \quad (9)$$

$$= \pm \frac{V_{t(Chr)}^+ + V_{t(Chr)}^-}{2} - (V_\rho + V_c) + \alpha_{(Chr)} \Delta T \quad (10)$$

The sign conventions for Equations 9 and 10 are the same as for Equations 2 and 3.

The thermoelectric properties are given by the equations:

$$\alpha = \frac{V_\alpha}{\Delta T} \quad (11)$$

$$\rho = \frac{V_\rho A}{IL} \quad (12)$$

$$k = \frac{\alpha I T L}{\Delta T A} \quad (13)$$

From the above considerations it can be readily shown that $$z = \frac{\alpha^2}{\rho k} = \frac{V_\alpha}{V_\rho T} \quad (14)$$

Although $z$ can be determined with high precision by proper application of this method, certain precautions must be taken. The sample must be located in a cell which is evacuated to prevent heat transfer by convection. The thermocouple and current lead wires must be long and of sufficiently small diameter to make heat flow along them negligible, but large enough to prevent excessive Joule heating of wires. The current must be adjusted and the geometry of the sample must be such as to give an adequate $\Delta T$ but not excessive Joule heating of the sample.

The following considerations give some indication of the accuracy of the method for measurement of thermoelectric materials. The data suggest that the relative error is probably on the order of 1%, with systematic errors somewhat larger.

From Equation 1 it is seen that $$I = f_1 \Delta T \text{ and } I = f_2 V_\alpha$$

where $$f_1 = \frac{kA}{LT\alpha} \text{ and } f_2 = \frac{kA}{LT\alpha^2}$$

Since all factors in $f_1$ and $f_2$ are constants at a given temperature, $\Delta T$ and $V_\alpha$ will vary linearly with current. Also from Equation 1 it is apparent that $\Delta T$ will vary linearly with the sample length $L$ for constant current $I$ at a given temperature.

Thermoelectric properties for two random samples, designated respectively 5b and 17a, of $Bi_2Te_3$, tested at 300° K. ambient temperature in accordance with the invention, are shown in the following table

| Sample | $\alpha$ μv./° K. | $k$ $10^{-2}$ watt/cm.-° K. | $\rho$ $10^{-3}$ ohm-cm. | $z$ $10^{-3}$/° K. | $I$ ma. |
|---|---|---|---|---|---|
| 5b | +235 | 1.97 | 1.90 | 1.47 | 5.38 |
| 5b | +237 | 2.00 | 1.90 | 1.47 | 9.70 |
| 17a | +214 | 2.06 | 1.07 | 2.08 | 20.0 |
| 17a | +214 | 2.05 | 1.07 | 2.09 | 40.0 |

These results are in good agreement with those obtained by other investigators using more complicated and time-consuming methods and apparatus.

Heat will be conducted to or from the sample by each copper lead directly connected to an end of the sample at the rate $$\frac{dQ}{dT} = k_{cu} \frac{A_{cu}}{L_{cu}} (T_s - T_a) \quad (15)$$

where $k_{cu}$ is the thermal conductivity of the lead, $A_{cu}$ is the cross-sectional area of the lead, $L_{cu}$ is the lead length, $T_s$ is the temperature of the sample end under consideration, which for convenience will be assumed to be the hot end, and $T_a$ is the ambient (e.g., room) temperature. With the sample 17a subjected to a current of 20 ma. at an ambient temperature of 300° K., the value $(T_s - T_a)$ measured 0.25° K. Using copper leads for which $A_{cu} = 5.03 \times 10^{-5}$ cm.$^2$, $L_{cu} = 25$ cm., and $k_{cu} = 4.18$ watts/cm.-° K., the rate of heat transfer is $$\frac{dQ}{dT} = 4.18 \frac{5.03 \times 10^{-5}}{25} (0.25)$$

$$= 2.1 \times 10^{-6} \text{ watt,}$$

which is clearly negligible in the frame of reference.

Heat due to the Peltier effect will be conducted from one end of the sample to the other at a rate given by the equation $$\frac{dQ}{dT} = I T \alpha \qquad (16)$$

Since I is 20 ma. and T is 300° K., and $\alpha$ was found (see above table) to be $+214$ $\mu v./°$ K., it follows that $$\frac{dQ}{dT} = (20 \times 10^{-3})(300)(214 \times 10^{-6}) = 1.3 \times 10^{-3} \text{ watt}$$

The rate of heat conducted from one end of the sample to the other is also given by an equation similar to Equation 15. Substituting the values $\Delta T = 0.51°$ K., $A = 0.227$ cm.$^2$, $L = 1.85$ cm., and $k = 2.06 \times 10^{-2}$ watt/cm.-° K., $$\frac{dQ}{dT} = (2.06 \times 10^{-2})\left(\frac{0.227}{1.87}\right)(0.51) = 1.3 \times 10^{-3} \text{ watt}$$

The rate of heat transfer to or from the sample by radiation is given by the equation $$\frac{dQ}{dT} = A^1 \alpha^1 \sigma^1 (T_w^4 - T^4) \qquad (17)$$

where $A^1$ is the surface area of the sample, $\alpha^1$ is the absorptivity of the sample, $\sigma^1$ is the Stefan-Boltzmann constant, $T_w$ is the absolute temperature in ° K. of the walls confining the sample, and T is the average absolute temperature of the sample. Substituting the values found for the several terms in accordance with the invention, $$\frac{dQ}{dT} = \sim 10^{-11} \text{ watt}$$

which is obviously insignificant in the frame of reference.

The rate of Joule heating of the sample is calculated from the equation $$\frac{dQ}{dT} = I^2 \rho \frac{L}{A} \qquad (18)$$

Since $\rho$ was found to be $1.07 \times 10^{-3}$ ohm-cm., it follows that $$\frac{dQ}{dT} = 3.5 \times 10^{-6} \text{ watt}$$

which is manifestly negligible in the frame of reference.

The rate of Joule heating of one copper current lead is similarly found to be $3.4 \times 10^{-4}$ watt. Although this rate is only a factor of three below the rate of transfer of the Peltier heat, probably less than half of the Joule heat flows into the sample. Also, since $\Delta T$ and $V_\alpha$ were observed to follow a linear relation with current, it is unlikely that the Joule effect is playing a significant role. The relative effect of Joule heating can be reduced by using samples that have smaller cross-sectional areas or are longer.

The transfer of heat by thermal convection has been considered. However, with the small specimen centered in a glass cell 6 cm. in diameter and 24 cm. high and the cell evacuated to about $2 \times 10^{-5}$ mm. of Hg, this heat-transfer effect is negligible.

Subjecting the sample 17a to a current of 20 ma., and using measuring techniques and apparatus in accordance with the invention, the following voltages were measured:

$(V_\rho + V_c) = 220$ $\mu v.$
$V_{T(Al)}^+ = 326$ $\mu v.$
$V_{T(Al)}^- = 342$ $\mu v.$
$V_{T(Chr)}^+ = 307.3$ $\mu v.$
$V_{T(Chr)}^- = 320$ $\mu v.$ From Equation 8, $$\Delta T = \frac{326 + 342 + -307 - 320}{80} = 0.51° K.$$

From Equation 9, $$V_\alpha = +\left(\frac{226 + 342}{2} - 220\right) - (10 \times 0.51) = 109 \ \mu v.$$

The same value is obtained for $V_\alpha$ using Equation 10. From Equation 11 the thermoelectric power is $$\alpha = \frac{109}{0.51} = +214 \ \mu v./° K.$$

and the thermal conductivity is $$k = \frac{214 \times 10^{-6} \times 20 \times 10^{-3} \times 300 \times 1.85}{0.51 \times 0.227}$$

$$= 2.06 \times 10^{-2} \text{ watt/cm.} = ° K.$$

Referring now more particularly to the drawing, disclosing an illustrative embodiment of the invention, there is shown in FIG. 1 a small test sample 10 of homogeneous thermoelectric semiconductor material in an evacuated cell 11 such as a belljar, and testing circuitry including among other things thermocouples 12 and 14, a 6-wafer, 8-position ganged switch 16 comprising wafers 18, 20, 22, 24, 26, and 28, with their respective switch arms 30, 32, 34, 36, 38, and 40, a high impedance A.C. vacuum tube microvoltmeter 42, a D.C. microvoltmeter 44, an alternating current source 46, a direct current source 48, and a known resistance 50. The entire apparatus is shielded at 54 against stray electrical fields.

One terminal of the A.C. source 46 is connected to contacts 1, 2, and 3 of the wafer 18; the other terminal of the A.C. source is connected to contacts 1, 2, and 3 of the wafer 20. One terminal of the D.C. source 48 is connected to contacts 4, 5, and 7 of the wafer 18, and to contacts 6 and 8 of the wafer 20; the other terminal of the D.C. source is connected to contacts 6 and 8 of the wafer 18 and to contacts 4, 5, and 7 of the wafer 20.

One end 55 of the sample 10 is connected by a wire 56 to the switch arm 30; the other end 57 of the sample is connected by a wire 58 and the resistance 50 to the switch arm 32 and to contact 1 of the wafer 22 and to contact 4 of the wafer 26, and by the wire 58 to contact 1 of the wafer 24 and to contact 4 of the wafer 28.

The A.C. microvoltmeter 42 is connected to the switch arms 34 and 36, and the D.C. microvoltmeter 44 is connected to the switch arms 38 and 40.

One leg 62 of the thermocouple 12 is connected to contact 3 of the wafer 24, to contact 6 of the wafer 26, and to contact 5 of the wafer 28. The like leg 64 of the thermocouple 14 is connected to contact 3 of the wafer 22, to contact 5 of the wafer 26, and to contact 6 of the wafer 28.

The other leg 68 of the thermocouple 12 is connected to contact 8 of the wafer 26 and to contact 7 of the wafer 28. The like leg 70 of the thermocouple 14 is connected to contact 7 of the wafer 26 and to contact 8 of the wafer 28.

Mutually spaced like lead wires 74 and 76 extending from the side of the sample 10 are connected to contact 2 of the respective wafers 24 and 22.

With the several switch arms in contact positions 1: the switch arms 30, 32, 34, and 36 are in use, and A.C. flows through the sample 10 and the known resistance 50, and the voltage $V_R$ across the resistance is measured on the A.C. microvoltmeter 42, enabling the RMS current to be computed.

With the several switch arms in contact positions 2: the switch arms 30, 32, 34, and 36 are in use, and A.C. flows through the sample 10 and resistance 50, and, using the side leads 74 and 76, the voltage $V_b$ across the portion b of the sample is measured by the instrument 42, enabling the resistivity $\rho$ of the sample to be computed.

With the several switch arms in contact positions 3: the switch arms 30, 32, 34, and 36 are in use, and A.C. flows through the sample 10 and resistance 50, and the voltage $(V_\rho + V_c)$ across the like legs 62 and 64 of the thermocouples 12 and 14, respectively, and the sample is measured by the instrument 42.

With the several switch arms in contact positions 4: the switch arms 30, 32, 38, and 40 are in use, and D.C. flows through the sample 10 and the resistance 50, and the voltage across the resistance is measured by the D.C. microvoltmeter 44, whereupon the operator adjusts the D.C. source until the current is identical with the A.C. previously used.

With the several switch arms in contact positions 5: the switch arms 30, 32, 38, and 40 are in use, D.C. flows in the positive direction through the sample 10 (producing a Peltier effect) and the resistance 50, and the total voltage across the like legs 62 and 64 of the respective thermocouples 12 and 14 and the sample in the positive direction is measured by the D.C. microvoltmeter 44.

With the several switch arms in contact positions 6: the switch arms 30, 32, 38, and 40 are in use, D.C. flows in the negative direction through the sample 10 (producing a Peltier effect) and the resistance 50, and the total voltage across the like legs 62 and 64 of the respective thermocouples 12 and 14 and the sample in the negative direction is measured by the instrument 44.

With the several switch arms in contact positions 7: the switch arms 30, 32, 38, and 40 are in use, D.C. flows in the positive direction through the sample 10 (producing a Peltier effect) and the resistance 50, and the total voltage across the other like legs 68 and 70 of the respective thermocouples 12 and 14 and the sample in the positive direction is measured by the instrument 44.

With the several switch arms in contact positions 8: the switch arms 30, 32, 38, and 40 are in use, D.C. flows in the negative direction through the sample 10 (producing a Peltier effect) and the resistance 50, and the total voltage across the like legs 68 and 70 of the respective thermocouples 12 and 14 and the sample in the negative direction is measured by the instrument 44.

Various suitable materials may be used for the leads 54 and 56 connecting the current sources to the ends of the sample 10, among which No. 40 copper wire has been found satisfactory. Various suitable thermocouples may be used, among which Chromel-Alumel have been found satisfactory. Accordingly the words Chromel and Alumel are not to be considered as words of limitation, but rather each is used merely as a convient means of distinguishing the two legs of each thermocouple. The thermocouple legs 62, 64, 68, and 70 and the side leads 74 and 76 are of any suitable materials which allow negligible heat loss by thermal conduction.

The values not measured in accordance with the invention can be obtained from standard reference works or computed from the measured values to obtain figures entering into final computations of the resistivity, thermoelectric power, and thermal conductivity and hence the figure of merit.

The entire test of a sample can be effected in accordance with the invention in a matter of some 10–20 minutes, including all necessary computations, and the work can be done by a relatively unskilled operator. The time taken for the Peltier effect to reach a steady state being less than the time taken to make and record the several measurements, it is unnecessary to pause after a reading is recorded before proceeding to take the next measurement.

The sample can be quickly replaced by another in the bell jar 11 pursuant to release of the vacuum.

If desired, instead of using the circuitry shown, each measurement could be obtained by means of probes applied by hand to the appropriate terminals.

Although the figures given above were obtained with a sample of $Bi_2Te_3$, the invention has been used with success on other semiconductors, including $Bi_2Te_3$—$10\% Bi_2Se_3$.

To insure good electrical contact of the leads and thermocouple junctures with the sample, the sample is silvered or otherwise suitably coated and the leads and junctures fused to the coats.

Whenever the difference between $+V_{T(Al)}{}^+$ and $(V_p+V_c)$ (see Equation 4) is found to be so small that reasonably accurate measurements of the thermoelectric properties cannot be obtained, the sample involved has too low a figure of merit to be determined with reasonable accuracy with the invention. The invention has been found useful in measuring the thermoelectric properties of materials with as low a figure of merit as about $10^{-3}/°K$. A sample having at least the minimum figure of merit enabling the thermoelectric properties to be obtained with reasonable accuracy in accordance with the invention will be understood to be one having an "appreciable" figure of merit.

A sample suitable for testing in accordance with the invention would be about 2 cm. in length and about ½ cm. in diameter. In principle there is no restriction on size provided the sample is homogeneous. However, since a large homogeneous sample is difficult to produce and requires more time to equilibrate, small samples are preferred.

Obviously many modifications and variations of the invention are possible in the light of the above teachings. It is therefore to be understood that within the scope of the appended claims the invention may be practiced otherwise than as specifically described.

I claim:

1. In a method of testing for its thermoelectric properties a homogeneous sample of thermoelectric semiconductor material having an appreciable figure of merit, the steps of preventing appreciable heat transfer by conduction and convection to and from the sample, connecting the sample in series with an alternating current voltage and a known resistance, connecting the junctures of thermocouples to the respective ends of the sample, each thermocouple having first and second legs, the first legs being alike and the second legs being alike, measuring the voltage across the resistance to ascertain the alternating current, measuring the voltage across an intermediate portion of the sample to ascertain the A.C. resistance of the sample, measuring the total A.C. voltage across a selected pair of like legs and the sample replacing the alternating current voltage with a direct current voltage to subject the sample to a Peltier effect, adjusting the direct current source to the same current as that which existed in the A.C. circuit, allowing the Peltier effect to reach a steady state, measuring the first leg-sample-first leg and second leg-sample-second leg D.C. voltages, reversing the direct current, allowing the resulting Peltier effect to reach a steady state, and measuring the first leg-sample-first leg and second leg-sample-second leg D.C. voltages while the direct current is so reversed, whereby the resistivity, thermoelectric power, and thermal conductivity of the sample, and thus its figure of merit, can be readily computed.

2. In a method of testing a homogeneous sample of thermoelectric semiconductor material for its thermoelectric parameters, the steps of substantially preventing transfer of heat to or from the sample by conduction and convection, connecting the junctures of thermocouples to the respective ends of the sample, each thermocouple having first and second legs, the first legs being alike and the second legs being alike, passing an alternating current through the sample, measuring the A.C. voltage across an intermediate portion of the sample, measuring the total A.C. voltage across a selected pair of like legs and the sample, replacing the alternating current source with a direct current source of the same amperage and allowing the resulting Peltier effect to reach a steady state, then measuring the first leg-sample-first leg and second leg-sample-second leg D.C. voltages, and reversing the direct current source and allowing the resulting Peltier effect to reach a steady state and then measuring the first leg-sample-first leg and second leg-sample-second leg D.C. voltages, whereby the resistivity, thermoelectric power, and thermal conductivity of the sample, and thus its figure of merit, can be readily computed.

3. In a method of testing a homogeneous sample of thermoelectric semiconductor material having an appreciable figure of merit and a volume substantially not in excess of about a few cubic centimeters, the steps of subjecting the sample to an evacuated environment, connecting the junctures of thermocouples to the respective ends of the sample, each thermocouple having first and second legs, the first legs being alike and the second legs being alike, connecting leads on the order of No. 40 wire to the ends of the sample and in series with a known resistance and an alternating current not substantially exceeding about 40 milliamperes, measuring the A.C. voltage across the resistance, the A.C. voltage across an intermediate portion of known length of the sample, and the total A.C. voltage across a selected pair of like legs and the sample, replacing the alternating current by a direct current of the same amperage, allowing the resulting Peltier effect to reach a steady state, then measuring the first leg-sample-first leg and second leg-sample-second leg D.C. voltages, reversing the direct current, allowing the resulting Peltier effect to reach a steady state, and then measuring the first leg-sample-first leg and second leg-sample-second leg D.C. voltages.

4. In a method of testing a homogeneous sample of thermoelectric material having an appreciable figure of merit for its thermoelectric parameters, the steps of protecting the sample against appreciable conduction and convection of heat to and from the sample, connecting the junctures of thermocouples to the respective ends of the sample, each thermocouple having first and second legs, the first legs being alike and the second legs being alike, passing an alternating current through the sample, making A.C. measurements to determine the resistivity and the sum of the IR voltage drops across the sample due to its resistance and due to the electrical contact resistance at the ends of the sample, replacing the alternating current source with a reversible direct current source of the same amperage, and measuring the first leg-sample-first leg and second leg-sample-second leg D.C. voltages for each direction of the current while the Peltier effect in each case is in a steady state.

5. In a method of determining whether a homogeneous sample of semiconductor material has an appreciable figure of merit, the steps of protecting the sample against heat transfer to or from it by thermal conduction and convection, connecting the ends of the sample to an alternating current source, connecting the junctures of thermocouples to the respective ends of the sample, measuring the sum of the IR drop along the sample and the voltage due to the contact resistance at the ends of the sample, replacing the alternating current source by a direct current source of the same amperage, and measuring the total D.C. voltage across a selected pair of the like legs of the respective thermocouples and the sample.

6. In an apparatus for testing thermoelectric semiconductor material for its thermoelectric parameters, a homogeneous sample of such material and of known length and cross-sectional area, means protecting the sample against appreciable gain or loss of heat by conduction and convection, a pair of wires leading respectively from two opposite ends of the sample, said wires being of sufficient diameter to carry currents up to about 40 milliamperes without transferring appreciable heat to or from the sample, thermocouples connected at their junctures to the respective ends of the sample, each thermocouple having first and second legs, the first legs being alike and the second legs being alike, a second pair of lead wires connected to the side of the sample in spaced relation to the ends of the sample and a known distance apart, an evacuated cage housing the sample, a known resistance in series with one of the first-mentioned pair of wires, an alternating current source, a reversible direct current source of the same amperage as the alternating current source, means for selectively connecting said sources in series with said resistance and the other one of the first-mentioned pair of wires, first measuring means for measuring the voltage across said resistance and the voltage across the portion of the sample between the second pair of wires and the total voltage across a selected pair of like legs and the sample while the alternating current is passing through the sample, second measuring means for measuring the first leg-sample-first leg and second leg-sample-second leg voltages while the direct current is passing through the sample in each direction and the Peltier effect in each case is steady, and means shielding the aforesaid instrumentalities from stray electric fields.

7. The structure of claim 6, characterized in that said amperage does not substantially exceed 40 milliamperes, the first measuring means comprises an A.C. vacuum-tube microvoltmeter, and the second measuring means comprises a D.C. microvoltmeter.

8. The structure of claim 6, characterized in that the first-mentioned pair of wires are on the order of a few mils in diameter, the volume of the sample is substantially less than one cubic centimeter, and said amperage does not substantially exceed about 40 milliamperes.

9. The structure of claim 6, characterized in that said second measuring means is also operative to measure the D.C. voltage across said resistance, and the direct current source is adjustable to the exact amperage of the alternating current source.

10. The structure of claim 9, including a 6-wafer, 8-position ganged switch for establishing the circuits for the several measurements.

References Cited in the file of this patent

UNITED STATES PATENTS 2,878,669    Knudson et al. _____ Mar. 24, 1959

UNITED STATES PATENT OFFICE
CERTIFICATE OF CORRECTION

Patent No. 2,994,818                                August 1, 1961

Theodore C. Harman

It is hereby certified that error appears in the above numbered patent requiring correction and that the said Letters Patent should read as corrected below.

Column 6, line 15, for "watt/cm.=°K." read -- watt/cm-°K. --; column 8, line 43, after "sample" insert a comma.

Signed and sealed this 5th day of December 1961.

(SEAL)
Attest:

ERNEST W. SWIDER                                    DAVID L. LADD
Attesting Officer                                         Commissioner of Patents

USCOMM-DC